US006237071B1

(12) United States Patent
Kim et al.

(10) Patent No.: US 6,237,071 B1
(45) Date of Patent: May 22, 2001

(54) MULTIACCESS CIRCUIT INCLUDING ARBITRATION CAPABILITIES TO EFFECTIVELY PERFORM PIPELINE AND SUSPEND OPERATIONS ACCORDING TO ITS PRIORITY

(75) Inventors: Doo-Hyeon Kim; Jin-Hyeock Im, both of Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/001,475

(22) Filed: Dec. 31, 1997

(30) Foreign Application Priority Data

Dec. 31, 1996 (KR) ............................................ 96 79127

(51) Int. Cl.7 .............................. G06F 12/00; G06F 9/00

(52) U.S. Cl. .......................... 711/169; 711/154; 712/205; 712/245

(58) Field of Search .................................... 711/169, 150, 711/151, 168, 152, 154; 712/32, 40, 43, 245, 205

(56) References Cited

U.S. PATENT DOCUMENTS 5,276,858 * 1/1994 Oak et al. ........................... 711/167
5,369,744 * 11/1994 Fukushima et al. ................. 345/501
5,523,698 * 6/1996 Antonello et al. ................... 324/759
5,586,286 * 12/1996 Santeler et al. ...................... 711/105
5,617,559 * 4/1997 Le et al. .............................. 711/169
5,699,553 * 12/1997 Iino et al. ........................... 711/151
5,737,765 * 4/1998 Shigeeda ............................. 711/170
5,787,488 * 7/1998 Garde .................................. 711/169
5,787,489 * 7/1998 Pawlowski ........................... 711/169
5,802,555 * 9/1998 Shigeeda ............................. 711/106
5,955,904 * 9/1999 Kawasaki ............................ 327/156
6,049,816 * 4/2000 Kim et al. ........................... 708/521

* cited by examiner

*Primary Examiner*—Matthew Kim
*Assistant Examiner*—Pierre Michel Bataille

(57) ABSTRACT

A multiaccess circuit for a memory, which arbitrates a multiaccess operation and suspends a pipeline operation until requested data is generated in the memory when the multiaccess operation to the memory is occurred in a certain step of the pipeline, is capable of effectively performing the pipeline operation, and the multiaccess circuit for the memory carries out the multiaccess operation to the memory in accordance with its priority, thus the pipeline operation is performed without any collision.

9 Claims, 10 Drawing Sheets

FIG. 1A CONVENTIONAL ART — FIRST INSTRUCTION

FIG. 1B CONVENTIONAL ART — SECOND INSTRUCTION

FIG. 1C CONVENTIONAL ART — THIRD INSTRUCTION

FIG. 1D CONVENTIONAL ART — FORTH INSTRUCTION

MULTIACCESS CIRCUIT INCLUDING ARBITRATION CAPABILITIES TO EFFECTIVELY PERFORM PIPELINE AND SUSPEND OPERATIONS ACCORDING TO ITS PRIORITY

BACKGROUND OF THE INVENTION

1. Field of the Invention

The present invention relates to memory access, and in particular to an improved multiaccess circuit for a memory, capable of performing a smooth processing when a multiaccess situation occurs in the memory in a process of a pipeline.

2. Description of the Conventional Art

FIGS. 1A to 1D are diagrams illustrating a four-steps pipeline.

A pipeline of a processor is a bus operation process during execution of instructions, and in case of the four-steps pipeline, the process is performed in the order of instruction fetch→decode→operand fetch→execution.

That is, as shown in FIGS. 1A to 1D, when an instruction 1 (INT1) is decoded after being fetched, an instruction 2 (INT2) is fetched. When the instruction 1 (INT1) is operand-fetched, the instruction 2 (INT2) is decoded and an instruction 3 (INT3) is fetched. When the instruction 1 (INT1) is executed, the instruction 2 (INT2) is operand-fetched, the instruction 3 (INT3) is decoded, and an instruction 4 (INT4) is newly fetched. As described above, each instruction is independently performed.

FIG. 2 illustrates a conventional processor for operating the 4-steps pipeline for the instructions.

As shown therein, the processor includes an instruction decoder 10 for decoding a program outputted from a ROM 13 and outputting a control signal for a pipeline operation; an addressing unit 11 for outputting an address signal of the ROM 13 and RAM 14 in accordance with the control of the instruction decoder 10; a memory access unit 12 for outputting a ROM_ADD signal for accessing the ROM 13 and a ROM_ADD signal for accessing the RAM 14; and an arithmetic operator 15 for operating a data outputted from the RAM 14 by the program outputted from the ROM 13 in accordance with the control of the instruction decoder 10.

The operation of the thusly constructed conventional processor will be described with reference to the accompanying drawings.

First, the addressing unit 11 generates the ROM address ROM_ADD, as shown in FIG. 3B, by each cycle of a clock signal CLK, and the ROM 13 loads a corresponding program as shown in FIG. 3C into a program bus PBUS in accordance with the ROM address ROM_ADD. The memory access unit 12 receives the address ADDR outputted from the addressing unit 11, accesses data of the RAM 14 by the RAM address RAM_ADD, and outputs the address to the arithmetic operator 15 over a data bus DBUS. Accordingly, the arithmetic operator 15 operates the data outputted from the RAM 14 in accordance with the control of the instruction decoder 10. That is, for a first cycle t1 of the clock signal CLK, the instruction decoder 10 receives a program outputted from the ROM 13, fetches an instruction 1, and synchronizes the instruction 1 which is fetched with the clock signal CLK as shown in FIGS. 3C and 3D. Next, for a second cycle t2 of the clock signal CLK, the instruction decoder 10 simultaneously decodes the fetched instruction 1 and fetches an instruction 2 as shown in FIGS. 3D and 3E.

For a third cycle t3 of the clock signal CLK, the instruction decoder 10 outputs a control signal by interpreting the decoded instruction 1, decodes the fetched instruction 2, and simultaneously fetches an instruction 3.

For a fourth cycle t4 of the clock signal CLK, the instruction decoder 10 generates a control signal with respect to the instruction 2, decodes the fetched instruction 3, and fetches an instruction 4, and the arithmetic operator 15 operates the data outputted from the RAM 14 in accordance with the control signal with respect to the instruction 1.

Thereafter, each process is independently and repeatedly carried out without any collision.

However, it is also possible to only employ the RAM, which can be applied as program and data, without separately using the ROM and RAM as shown in FIG. 2, or using the RAM 14 as the program and data by downloading a new program from an external memory to the RAM 14 when the ROM 13 and RAM 14 are separately provided.

However, in case where the multiaccess to the RAM 14 employed as the data and program occurs, that is when the program and data stored in the RAM 14 are simultaneously requested, the conventional processor has no circuit for arbitrating the multiaccess, thus the collision among the instructions may occur and such collision may lead to an erroneous operation of the processor.

SUMMARY OF THE INVENTION

Accordingly, it is an object of the present invention to provide a multiaccess circuit for a memory, capable of carrying out a smooth processing by arbitrating a multiaccess operation and suspending a pipeline operation until data is generated in the memory when the multiaccess operation to the memory occurs in a certain step of a pipeline.

To achieve the above objects, there is provided a multiaccess circuit for a memory which includes a RAM storing both data and programs, a subprocessor for outputting various signals for performing a pipeline operation by reading an instruction outputted from the RAM, a memory access arbiter for enabling a waiting signal for suspending the pipeline operation being performed in the subprocessor while arbitrating a multiaccess operation to the RAM in accordance with a control signal outputted from the subprocessor, a first input cut-off unit for cutting off the instruction being inputted to the subprocessor when the waiting signal is enabled in the memory access arbiter, and a second input cut-off unit for cutting off the control signal being inputted to the memory access arbiter when the waiting signal is enabled in the memory access arbiter.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
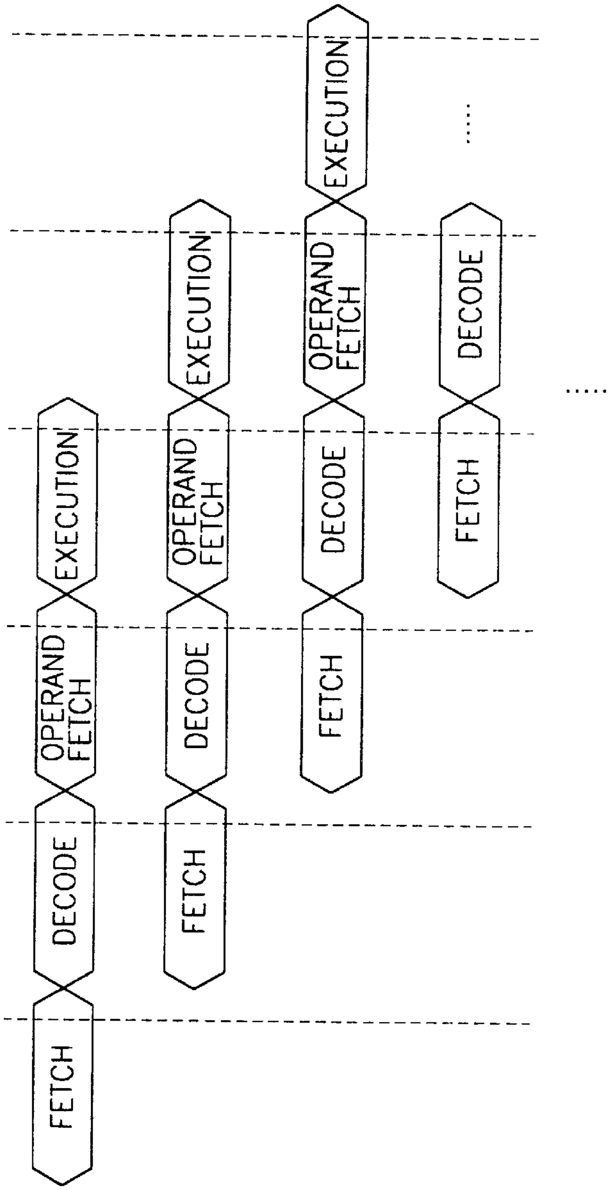
FIGS. 1A to 1D are conceptual diagrams illustrating a conventional four-steps pipeline.
Figure 2:
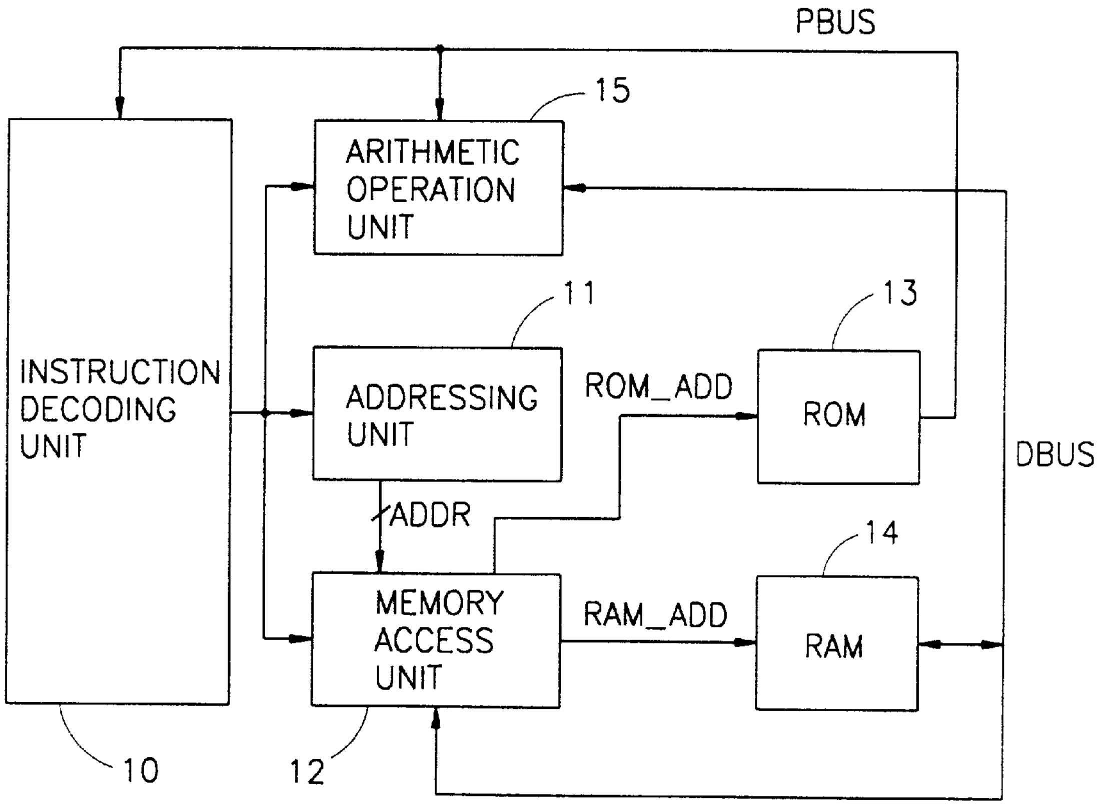
FIG. 2 is a diagram illustrating a conventional processor for operating a four-steps pipeline for an instruction.
Figures 3A, 3B, 3C, 3D, 3E, 3F, 3G:
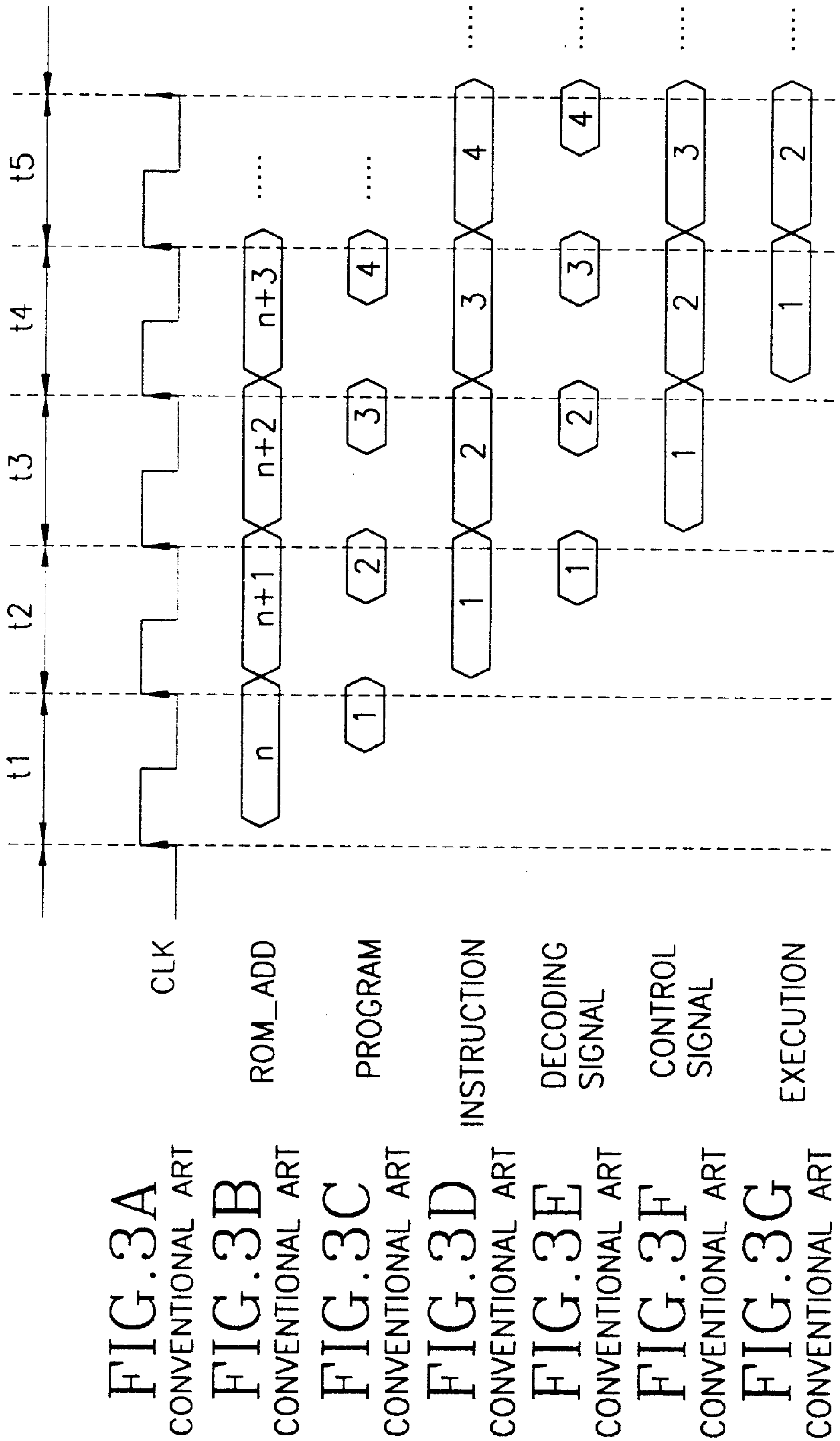
FIGS. 3A to 3G illustrate operation timing diagrams of the four-steps pipeline according to the FIG. 2.
Figure 4:
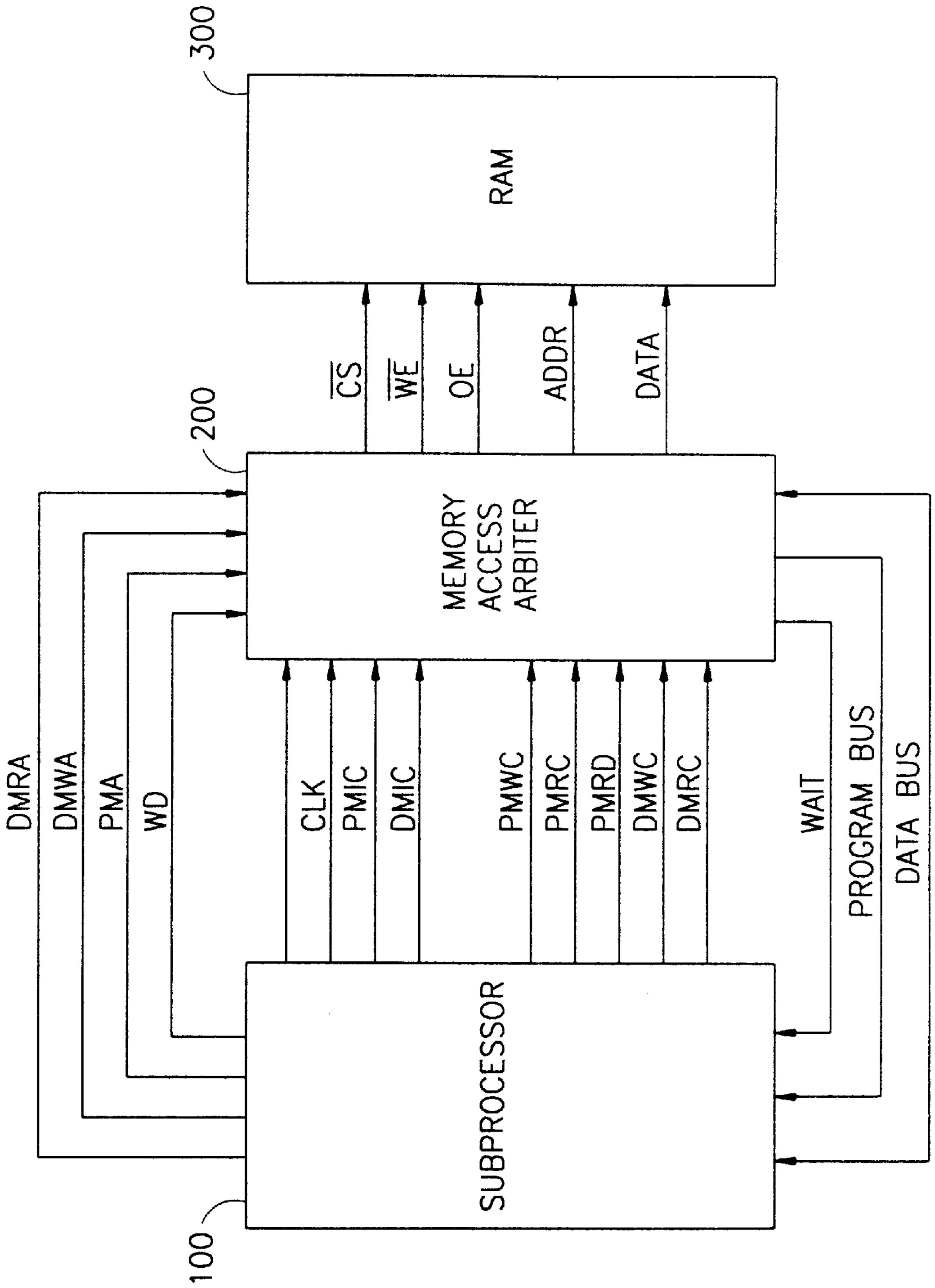
FIG. 4 is a conceptual diagram of a multiaccess circuit for a memory according to an embodiment of the present invention.

FIG. 4 is a conceptual diagram of a multiaccess circuit for a memory according to an embodiment of the present invention, wherein both RAM 300 stores a program and data, a subprocessor 100 reads instruction data outputted from the RAM 300 and outputs various control signals DMRA–DMRC for carrying out a pipeline operation, and a memory access arbiter 200 operates the output signals DMRA–DMRC from the subprocessor 100, thus outputting control signals /CS,/WE,OE for accessing the RAM 300, an address signal, and a data signal and activating a waiting signal WAIT in the multiaccess operation.

Figure 5:
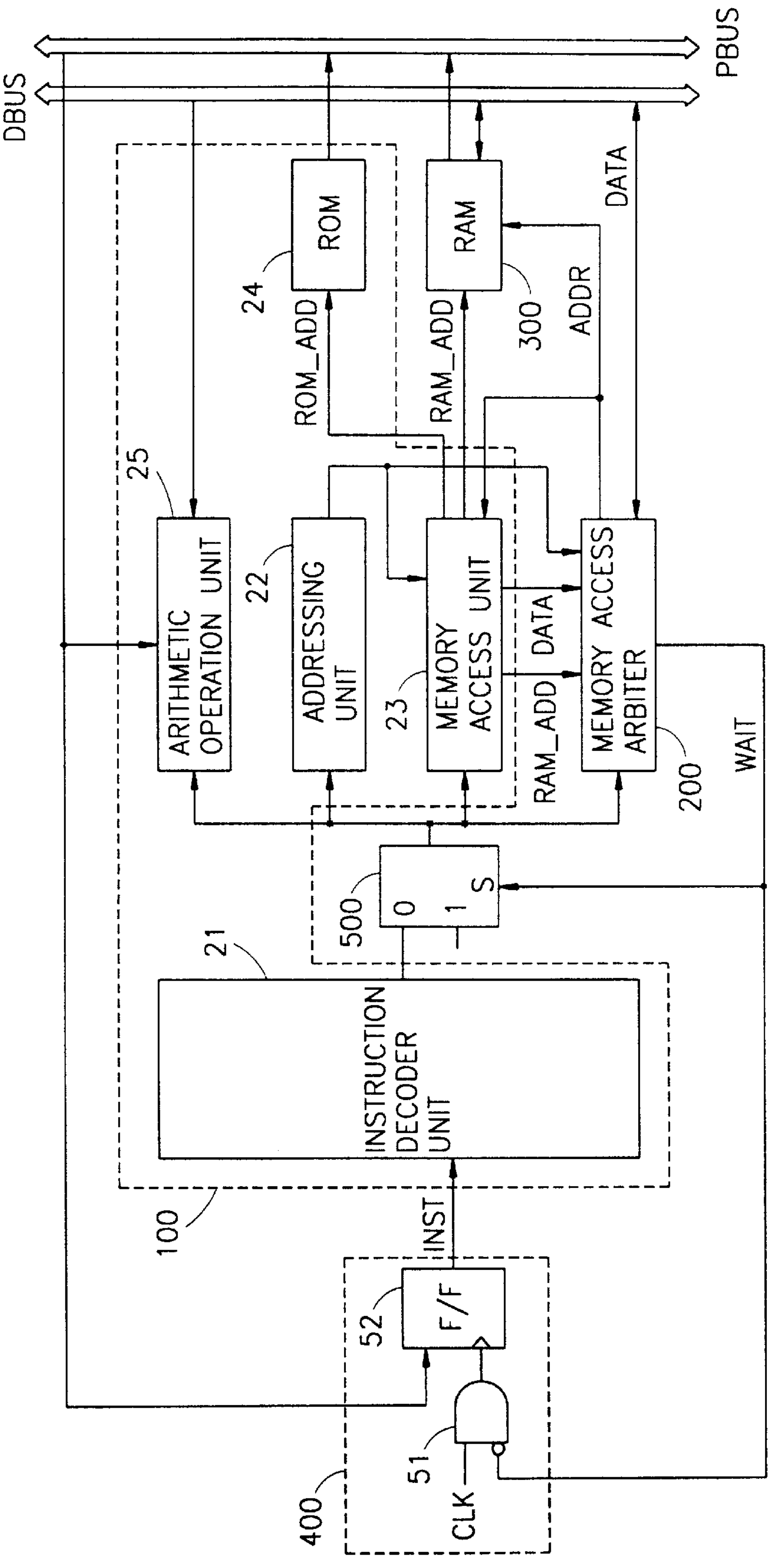
FIG. 5 illustrates a multiaccess circuit for a memory according to the embodiment of the present invention.

FIG. 5 illustrates an embodiment of the multiaccess circuit for the memory according to the present invention.

As shown therein, the circuit according to the present invention includes a RAM 300 storing both program and data; a subprocessor 100 for reading a program (an instruction) outputted from the RAM 300, thereby simultaneously carrying out a pipeline operation of the instruction and outputting various control signals; a memory access arbiter 200 for enabling a waiting signal WAIT in a multiaccess operation of the RAM 300 and outputting control, address, and data signals for accessing the RAM 300 by operating the control signals outputted from the subprocessor 100; a first input cut-off unit 400 for cutting off the instruction being inputted to the subprocessor 100 when the waiting signal WAIT is enabled; and a second input cut-off unit 500 for cutting off the control signal being inputted to the memory access arbiter 200 when the waiting signal is enabled.

The first input cut-off unit 400 includes an AND gate 51 for logically multiplying the inverted waiting signal WAIT by a clock signal CLK, and a flip-flop 52 for outputting an instruction by fetching a program outputted from a ROM 24 of the subprocessor 200 in a rising edge of the clock signal CLK outputted from the AND gate 51 and suspending a fetching operation of the program when the waiting signal WAIT is enabled. The second input cut-off unit 500 is a multiplexer.

Figure 6:
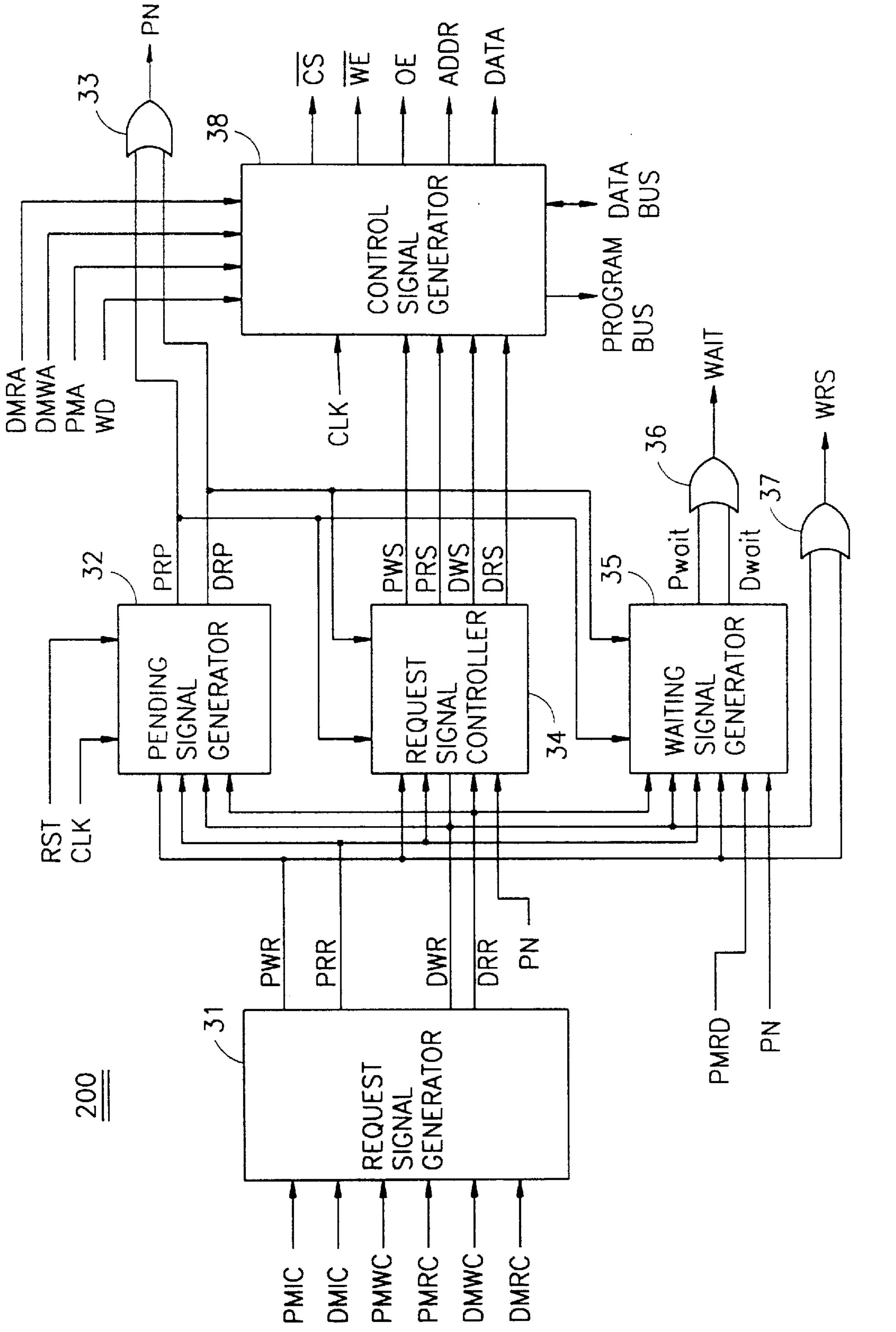
FIG. 6 is a block diagram of a memory access arbiter of FIG. 5.

FIG. 6 shows the construction of the memory access arbiter 200.

As shown therein, a request signal generator 31 generates program read/write request signals PWR,PRR and data read/write request signals DWR,DRR, in accordance with control signals PMIC,DMIC indicating whether the RAM 300 is for program or a data, and program memory read/write control signals PMWC,PMRC, and data memory read/write control signals DMWC,DMRC.

A pending signal generator 32 reads the write/read request signals PWR,PRR,DWR,DRR outputted from the request signal generator 31, and generates program and data read pending signals PRP,DRP, and an OR gate 33 ORs the program and data read pending signals PRP,DRP and outputs a pending signal PN.

A request signal controller 34 receives the program and data read pending signals PRP,DRP outputted from the pending signal generator 32, the pending signal PN, and the write/read request signals PWR,PRR,DWR,DRR outputted from the request signal generator 31, and outputs program and data read/write signals PWS,PRS,DWS,DRS.

A waiting signal generator 35 receives a read data signal PMRD from program memory, the write/read request signals PWR,PRR,DWR,DRR outputted from the request signal generator 31, and the read pending signals PRP,DRP outputted from the pending signal generator 32, and outputs program and data waiting signals Pwait,Dwait in accordance with the pending signal PN.

An OR gate 36 ORs the program and data waiting signals Pwait,Dwait and outputs a waiting signal WAIT, and an OR gate 37 ORs the program and data write request signals PWR,DWR outputted from the request signal generator 31 and outputs a write request signal WRS.

A control signal generator 38 generates control signals /CS,/WE,OE for accessing the RAM 300 by logically operating on the program and data write/read signals PWS,PRS, DWS,DRS outputted from the request signal controller 34. Also, the control signal generator 38 receives a data signal WD and address signals DMRA,DMWA,PMA from the subprocessor 100 and outputs address and data signals ADDR,DATA for accessing the RAM 300.

Figure 7:
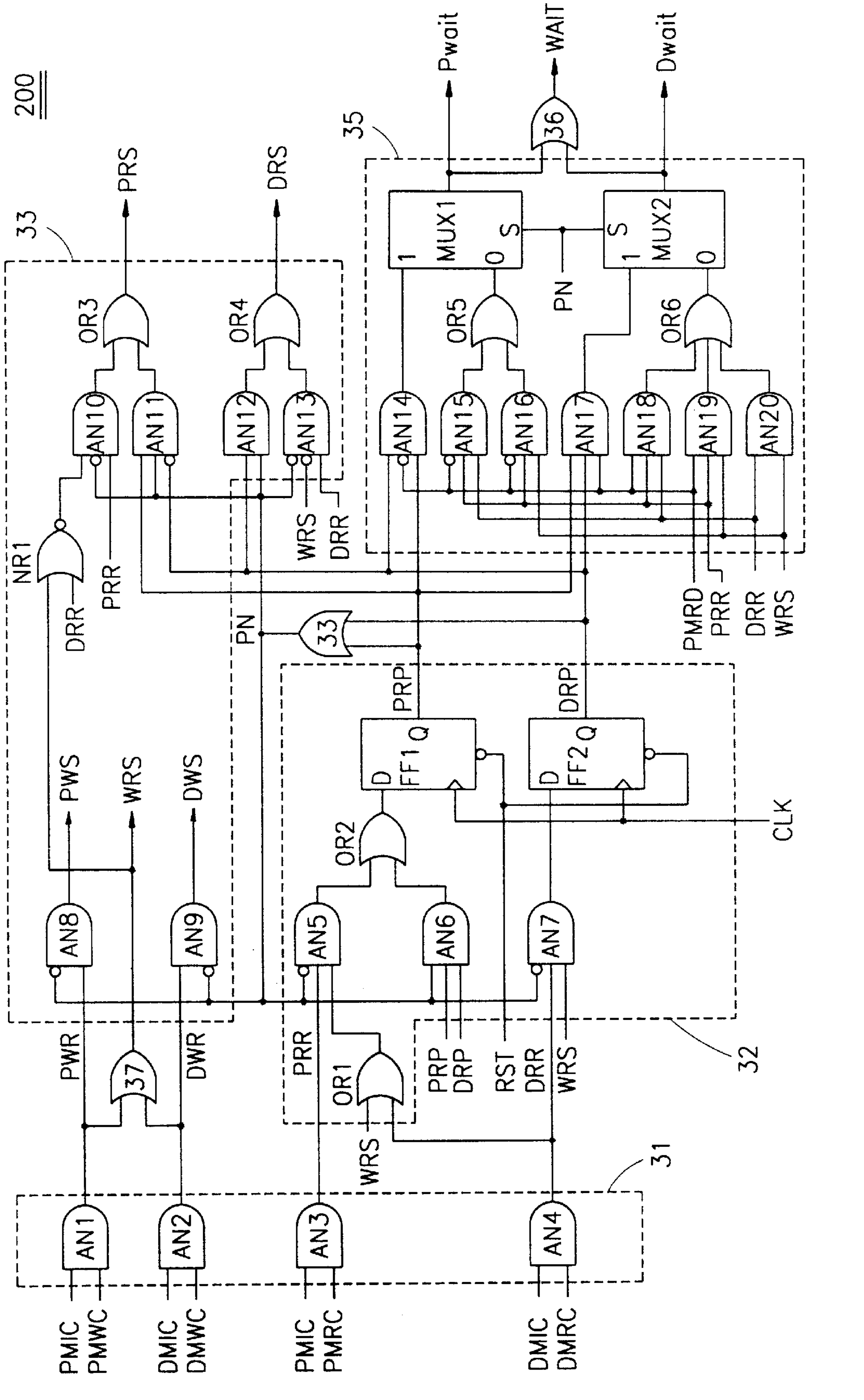
FIG. 7 is a block diagram illustrating a request signal generator, a pending signal generator, a request signal controller, and a waiting signal generator in FIG. 6.
Figure 8:
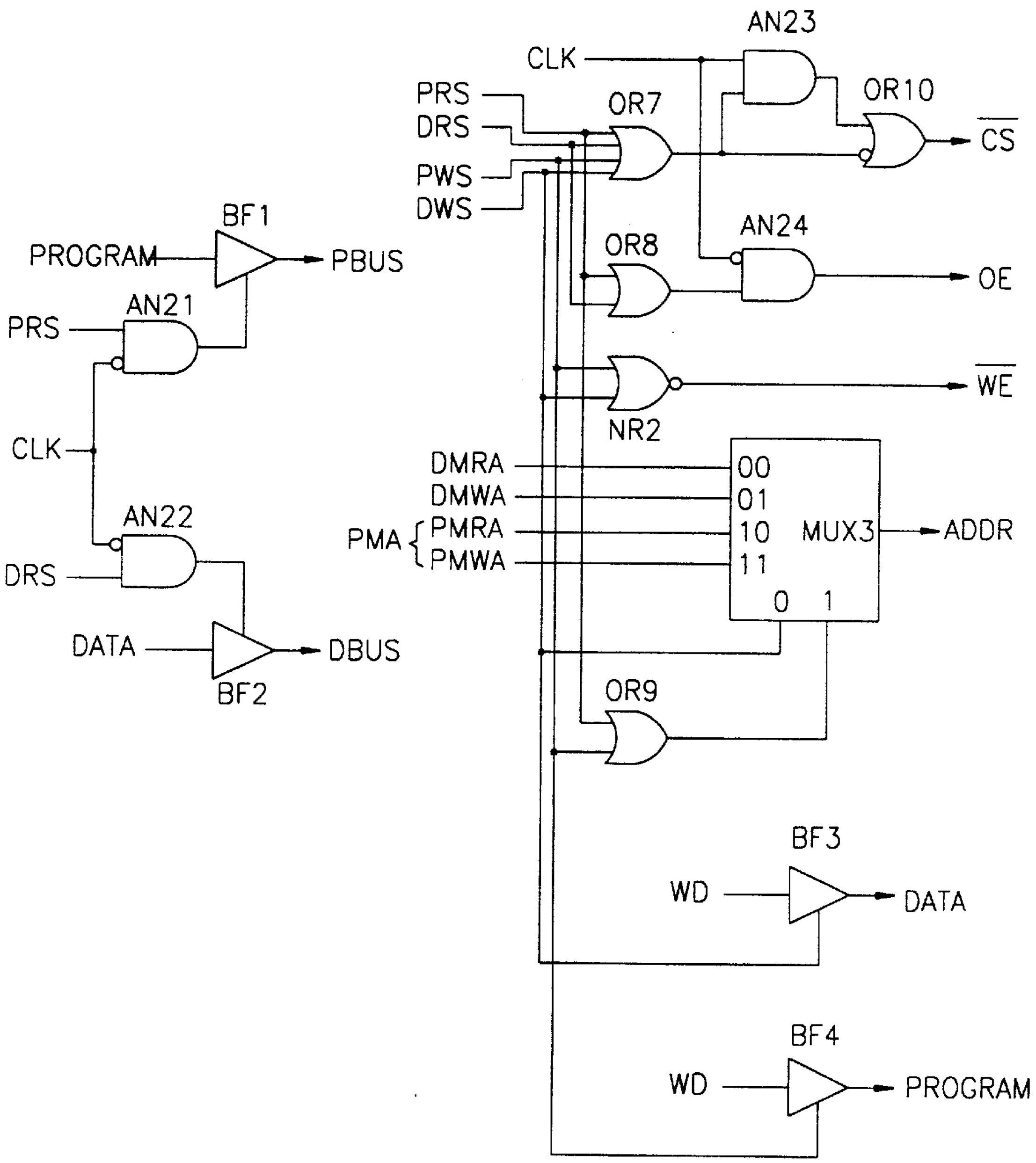
FIG. 8 is a block diagram illustrating a control signal generator in FIG. 6.

FIGS. 7 and 8 illustrate the detail circuit construction of the memory access arbiter 200.

With reference to accompanying drawings, the operation of the thusly constructed multiaccess circuit of the memory will be described.

According to the embodiment of the present invention, the ROM 24 and the RAM 300 are separately provided. Therefore, when the ROM 24 and the RAM 300 are used to access the program and the data, respectively, the pipeline operation in the subprocessor 100 is identical to the conventional art.

However, when accessing the RAM 300 is used to access both program and data, the memory access arbiter 200 receives ROM address ROM__ADD, RAM address ROM__ADD, and data for writing from the subprocessor 100, and generates the waiting signal WAIT for suspending the pipeline operation performed in the subprocessor 100 while arbitrating the multiaccess.

First, the memory access arbiter 200 receives the control signals PMIC,DMIC from the subprocessor 100, and determines whether the RAM 300 is for the program or the data as shown in Table 1.

TABLE 1

| PMIC | DMIC | RAM OPERATION CONDITION |
|---|---|---|
| 0 | 0 | RAM disable |
| 0 | 1 | mapped into data |
| 1 | 0 | mapped into program |
| 1 | 1 | mapped into data and program |

That is, when the control signal PMIC is 1, the RAM 300 is for the program, and when the control signal DMIC is 1, the RAM 300 is for the data. When the two control signals PMIC,DMIC are 1, the RAM 300 is for both the data and program. In addition, when the multiaccess to the RAM 300 is generated, the memory access arbiter 200 suspends the pipeline operation until the requested data is ready in the RAM 300, thus preventing a collision among the instructions and enabling the smooth processing.

As shown in FIG. 5, when the multiaccess to the RAM 300 is generated, the memory access arbiter 200 enables the waiting signal WAIT and suspends the operation of the first and second input cut-off units 400,500, thus the pipeline operation is suspended until the data is prepared in the RAM 300 and the access operation to the RAM 300 is performed.

When the data is ready in the RAM 300, the memory access arbiter 200 disables the waiting signal WAIT and resumes the operation for the first and second input cut-off units 400,500, whereby the pipeline, being suspended, starts to operate.

With reference to FIGS. 6 to 8, the multiaccess arbitrating operation performed by the memory access arbiter 200 will be described.

When the subprocessor 100 outputs the control signals PMIC,DMIC at a high level, the RAM 300 is used for the data and program. When all of the program memory write/read signals PMWC,PMRC and the data memory write/read signals DMWC,DMRC are inputted to the memory access arbiter 200 at a high level, that is when the multiaccess request signal is inputted to the RAM 300, each of AND gates AN1–AN4 of the request signal generator 31 respectively generates request signals according to its priority.

Here, the request signals are generated in the memory access arbiter 200 in the order of the memory write signals PWR,DWR→the data read signal DRR→the program read signal PRR. The OR gate 37 ORs the program write request signal PWR and the data write request signal DWR, which are outputted from the request signal generator 31, and generates the write request signal WRS, since the two write signals are not simultaneously inputted thereto.

One writing operation and two reading operations may simultaneously occur with respect to a single memory (RAM) for one cycle. Here, since the writing operation has the lowest priority, pending the two reading operations is required until the writing operation is finished.

In case where the request signal generator 31 outputs the program write request signal PWR or the data write request signal DWR to the request signal controller 34 in an initial state, AND gates AN8,AN9 of the request signal controller 34, which received the program write request signal PWR or data write request signal DWR, output the program write signal PWS and data write signal DWS, respectively, and buffers BF3 and BF4 of the control signal generator 38 write the program and data WD in the RAM 300 in accordance with the data write signal DWS and program write signal PWS. Here, an OR gate OR10 enables the chip selecting signal /CS, and a NOR gate NR2 enables the write enabling signal /WE, and a multiplexer MUX3 outputs program write address PMWA and data memory write address DMWA in accordance with a control signal outputted from an OR gate OR9. When the data read request signal DRR and the data write request signal DWR are simultaneously inputted to the request signal controller 34, first the request signal controller 34 outputs the data write request signal WRS and thus operates the data writing operation as described above since the read request signal has a lower priority than the write request signal. In addition, the pending signal generator 32 outputs the data read pending signal DRP through an AND gate AN7 and a flipflop FF2 while the data writing operation is being performed, thus pending the data read signal DRS outputted from the request signal generator. Next, when the data writing operation is completed, the request signal controller 34 outputs the data read signal DRS through AND and OR gates AN12,OR4. The control signal generator 38 which receives the data read signal DRS activates chip selecting signal /CS and output enable signal OE, and selectively outputs a data memory read address signal DMRA through a multiplexer 3, thereby reading the data in the RAM 300, and the data read from the RAM 300 is loaded into a data bus DBUS through the buffer BF2.

When the data read request signal DRR is only inputted to the request signal controller 34 without the data write request signal DWR, the request signal controller 34 directly outputs the data read signal DRS and performs the data reading operation described as above.

When the program read request signal PRR is inputted to the request signal controller 34, the program read signal PRS depends upon the existence of the write request signal WRS or data read request signal DRR. Here, when there is no write request signal WRS and data read request signal DRR, the program read signal PRS is outputted through the order of the NOR gate AN10→the AND gate NR1→the OR gate OR3. In case where either the write request signal WRS or data read signal DRR exists, meaning that there exists a request signal in a high priority which is not yet processed, the request signal controller 34 waits until the writing operation is completed, maintaining the data read pending signal DRP at a high level. Next, while the data reading operation is being performed after the data writing operation is completed, the request signal controller 34 outputs the program read pending signal PRP through the order of the OR gate OR1→the AND gate AN5→the OR gate OR2→the flipflop FF1 and waits until the reading operation for the data having a high priority is completed. When the data read pending signal DRP becomes a low level after the data reading operation, the program read signal PRS is outputted through an AND gate AN11→the OR gate OR3. Accordingly, the control signal generator 38 activates the chip selecting signal /CS and output enable signal OE, and selectively outputting the program memory read address signal PMRA over the multiplexer MUX3, thus reading the program from the RAM 300. The program read from the RAM 300 is loaded into the program bus PBUS through the buffer BF1.

On the other hand, when the multiaccess to the RAM 300 is requested, the waiting signal generator 35 outputs the program waiting signal Pwait or data waiting signal Dwait according the following table (Table 2).

TABLE 2

```
if Pending signal (PN) = '0' then
    Pwait ← (WRS and PRR and not PMRD)
        or (DRR and PRR and not PMRD);
    Dwait ← (WRS and DRR)
        or (WRS and PRR and PMRD)
        or (DRR and PRR and PMRD);
else
    Pwait ← DRP and PRP and not PMRD
    Dwait ← DRP and PRP and PMRD
```

The program memory read data signal PMRD determines whether the read data is the program or a general data when reading the data from the RAM 300. Here, the data which is 0 means the program, and the data, 1, means the general data.

That is, on condition that the pending signal PN is 0 and the program memory read data signal PMRD is 0, when the write request signal WRS and program read request signal PRR are inputted, the waiting signal generator 35 outputs the program waiting signal Pwait through the order of an AND gate AN16→the OR gate OR5→the multiplexer MUX1, and when the data read request signal DRR and program read request signal are inputted, the waiting signal generator 35 outputs the program waiting signal Pwait through an AND gate AN15.

In addition, on condition that the pending signal PN is 0, when the write request and data read request signals WRS, DRR are inputted, the waiting signal generator 35 outputs the data waiting signal Dwait through an AND gate AN20→the OR gate OR6→a multiplexer MUX2, and when the write request, program read request, and program memory read data signals WRS,PRR,PMRD are inputted, the waiting signal generator 35 outputs the data waiting signal Dwait through an AND gate AN19, and when the data read request, program read request, and program memory read data signals DRR,PRR,PMRD are inputted, the waiting signal generator 35 outputs the data waiting signal Dwait through an AND gate AN18.

On condition that the pending signal PN is 1, when the data and program read pending signals DRP,PRP are inputted and the program memory read data PMRD is not inputted, the waiting signal generator 35 outputs the program waiting signal Pwait through the multiplexer 1, and when the data and program read pending signals DRP, PRP, and the program memory read data signal PMRD are inputted, the waiting signal generator 35 outputs the data waiting signal Dwait through the multiplexer MUX1 and an AND gate AN17.

Figures 9A, 9B, 9C, 9D, 9E, 9F, 9G, 9H, 9I, 9J, 9K, 9L, 9M, 9N:
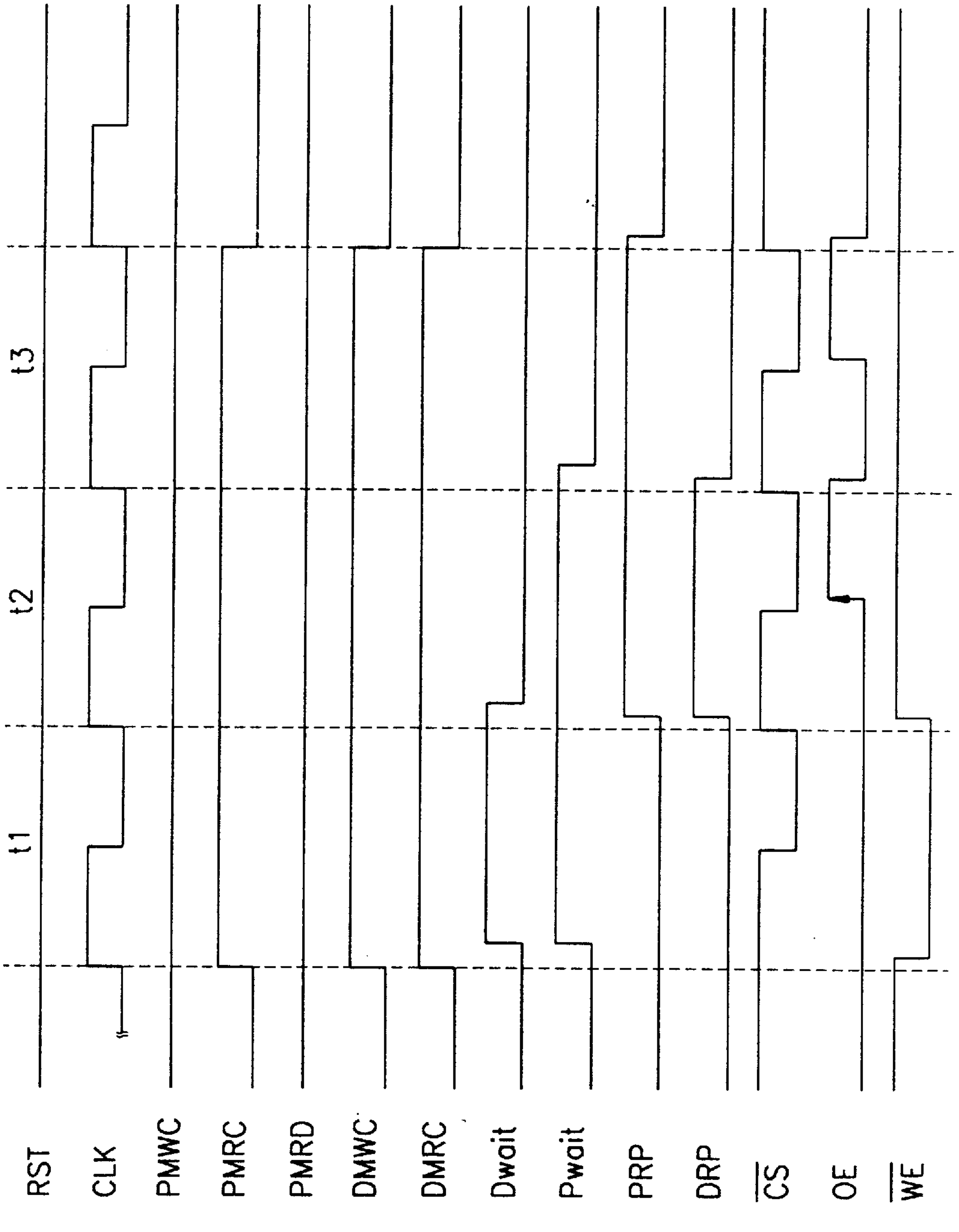
FIGS. 9A to 9N are timing diagrams in a case where a program read signal, and data write and read request signals are simultaneously generated in a multiaccess circuit for a memory according to the embodiment of the present invention.

FIGS. 9A to 9N are timing diagrams in a case where the program memory read data signal PMRD is 0, and the signals for reading the program, writing the executed data in the RAM 300, and reading the data to be executed from the RAM 300, respectively, are simultaneously generated.

That is, when each of the program memory read control signal PMRC as shown in FIG. 9D and the data memory write/read control signals DMWC,DMRC as shown in FIGS. 9F and 9G, respectively, becomes a high level, the operation priority thereof is writing→data reading→program reading.

The data writing operation is performed for time t1 without generating the pending signal PN, the data reading operation loads the read data signal into the data bus DBUS when the output enable signal OE becomes a high level in time t2 in accordance with a data read pending signal DRP as shown in FIG. 9K, and the program reading operation is carried out in accordance with a program read pending signal PRP as shown in FIG. 9J in time t3.

At this time, the pipeline operation is suspended for the times t1, t2, for which each of the data and program waiting signals Dwait, Pwait is at a high level, and resumed when all data requested in time t3 are generated.

Figures 10A, 10B, 10C, 10D, 10E, 10F, 10G:
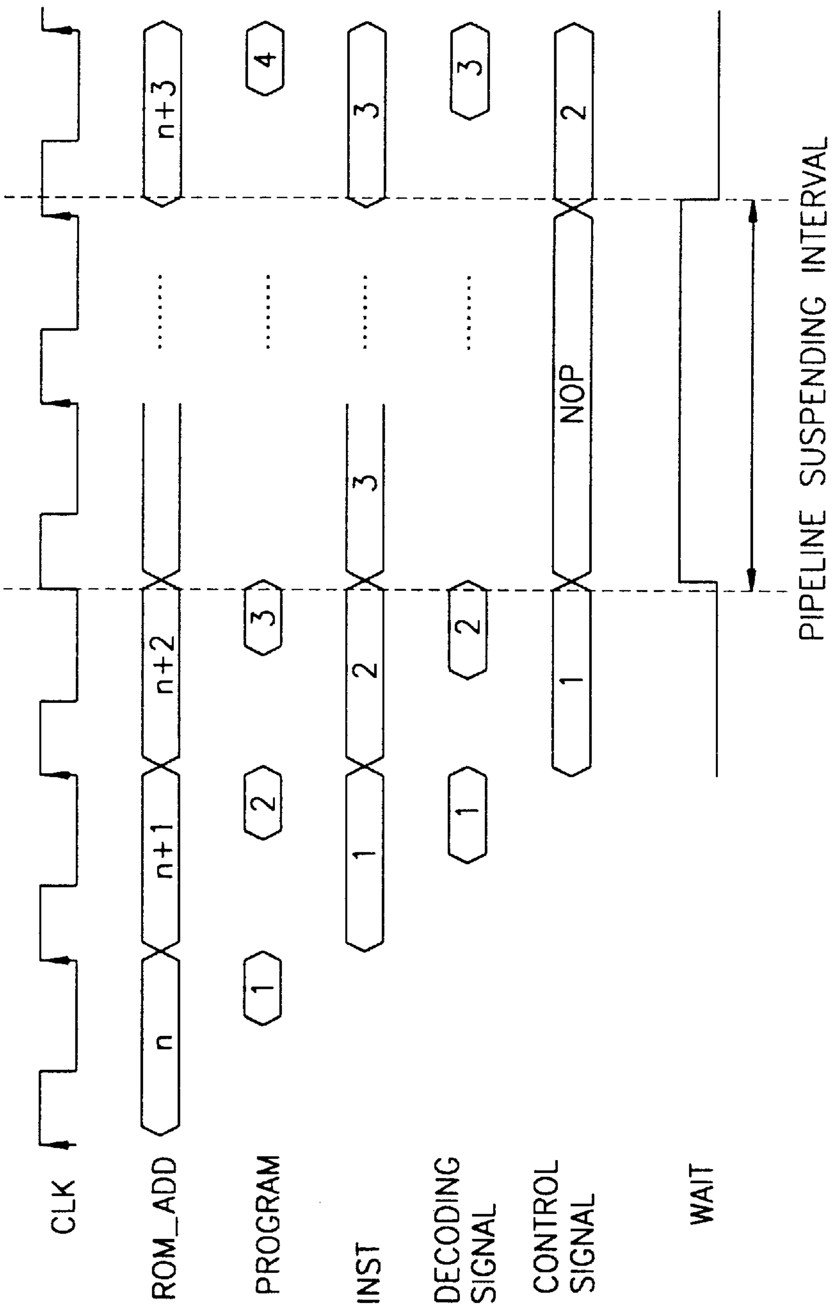
FIGS. 10A to 10G illustrate suspending timing diagrams of a pipeline in case of a multiaccess according to the embodiment of the present invention.

FIGS. 10A to 10G illustrate a suspending timing diagram of the pipeline when the memory access arbiter 200 outputs the waiting signal WAIT. An instruction signal INST is inputted to the first input cut-off unit 400 by the waiting signal WAIT of a high level outputted from the memory access arbiter 200 and the control signal is outputted from the second input cut-off unit 50. As shown in FIGS. 10D and 10F, the instruction signal INST and control signal are cut off, and therefore the operation of each unit is suspended for the pipeline suspending interval. When the waiting signal WAIT returns to the low level, the normal pipeline operation is resumed.

As described above, the multiaccess circuit for the memory according to the present invention is capable of carrying out a smooth processing by arbitrating a multi-access operation and suspending a pipeline operation until data is generated in the memory when the multiaccess operation to the memory is occurred in a certain step of the pipeline.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. A multiaccess circuit for a memory, comprising:

a random access memory (RAM) storing information;

a subprocessor outputting control signals including at least one of program read/write and data read/write signals and a memory control signal for selectively designating the information as one of data information, program information, and data and program information;

a memory access arbitrating unit mapping the information into the memory based on the designation;

a first input cut-off unit cutting off an instruction being inputted to the subprocessor when a waiting signal is enabled in the memory access arbitrating unit, wherein the first input cut-off unit includes:

a first AND gate ANDing an inverted waiting signal with a clock signal; and a flip-flop outputting an instruction by fetching a program signal outputted from a read only memory (ROM) of the subprocessor in a rising edge of the clock signal outputted from the first AND gate, the flip-flop suspending a fetching operation of the program from the RAM when the waiting signaled is enabled; and a second input cut-off unit cutting off the control signal being inputted to the memory access arbitrating unit when the waiting signal is enabled in the memory access arbitrating unit.

2. The circuit of claim 1, wherein the memory access arbitrating unit comprises:

a request signal generating unit for generating program read/write request signals and data read/write request signals, in accordance with first and second control signals indicating whether the RAM is for the program or data, and program memory read/write control signals and data memory read/write control signals;

a pending signal generating unit for generating program read pending and data read pending signals by operating the write/read request signals outputted from the request signal generating unit;

a pending signal output unit for outputting a pending signal by logically operating the program and data read pending signals;

a request signal control unit for outputting program and data read/write signals by logically operating the program and data read pending signals outputted from the pending signal generating unit, the pending signal outputted from the pending signal output unit, and the write/read request signals outputted from the request signal generating unit;

a waiting signal generating unit for outputting program and data waiting signals in accordance with the pending signal by logically operating a read data signal of a program memory, the write/read request signals outputted from the request signal generating unit, and the read pending signals outputted from the pending signal generating unit;

a write request signal output unit for outputting a write request signal by ORing the program and data write request signals outputted from the request signal generating unit; and a control signal generating unit for generating control signals for accessing the RAM by logically operating the program and data write/read signals outputted from the request signal control unit, and receiving address signals and a write data signal from the subprocessor and outputting address and data signals for accessing the RAM.

3. The circuit of claim 2, including:

a first AND gate ANDing the first control signal, indicating the RAM is for the program, and the program memory write control signal;

a second AND gate ANDing the second control signal, indicating the RAM is for the data, and the data memory write control signal;

a third AND gate ANDing the first control signal, indicating the RAM is for the program, and the program memory read control signal; and a fourth AND gate ANDing the second control signal, indicating the RAM is for the data, and the data memory read control signal;

wherein the first through fourth AND gates are parts of the request signal generating unit.

4. The circuit of claim 2, including:

a first OR gate ORing the write request signal and the data read request signal;

a fifth AND gate ANDing an inverted pending signal, the program read request signal and a signal outputted from the first OR gate;

a sixth AND gate ANDing the pending signal, and the program read pending and data read pending signals;

a seventh AND gate ANDing the inverted pending signal, the data read request signal and the write request signal;

a second OR gate ORing signals outputted from the fifth and sixth AND gates;

a first flipflop outputting the program read pending signal by fetching a signal outputted from the second OR gate in accordance with the clock signal; and a second flipflop outputting the data read pending signal by fetching a signal outputted from the seventh AND gate in accordance with a clock signal;

wherein the first and second OR gates, the fifth through the seventh AND gates, and the first and second flip flops are parts of the pending signal generating unit.

5. The circuit of claim 2, including:

an eighth AND gate ANDing an inverted pending signal and the program write request signal to output the program write signal;

a ninth AND gate ANDing the inverted pending signal and the data write request signal to output the data write signal;

a first NOR gate NORing the write request signal and the data read request signal;

a tenth AND gate ANDing the inverted signal, a signal outputted from the first NOR gate, and the program read request signal;

an eleventh AND gate ANDing the pending signal, the program read pending signal, and an inverted data read pending signal;

a third OR gate Oring signals outputted from the tenth and eleventh AND gates to output the program read signal;

a twelfth AND gate ANDing the pending signal and data read pending signal;

a thirteenth AND gate ANDing the inverted pending signal, write request signal, and data read request signal; and a fourth OR gate Oring signals outputted from the twelfth and thirteenth AND gates to output the data read signal, wherein the eighth through thirteenth AND gates, the first NOR gate, and the third and fourth OR gates are parts of the request signal control unit.

6. The circuit of claim 2, including:

a fourteenth AND gate ANDing the data read pending signal, an inverted program memory read data signal, and the program read pending signal;

a fifteenth AND gate ANDing the inverted program memory read data signal, and program and data read request signals;

a sixteenth AND gate ANDing the inverted program memory read data signal, program read request signal, and write request signal;

a seventeenth AND gate ANDing the program and data read pending signals, and a program memory read data signal;

an eighteenth AND gate ANDing the program memory read data signal, and the program and data read request signals;

a nineteenth AND gate ANDing the program memory read data signal, program read request signal, and write request signal;

a twentieth AND gate ANDing the data read request signal and write request signal;

a fifth OR gate ORing signals outputted from the fifteenth and sixteenth AND gates;

a sixth OR gate ORing signals outputted from the eighteenth, nineteenth, and twentieth AND gates;

a first multiplexer outputting the program waiting signal by selectively outputting signals outputted from the fourteenth AND gate and fifth OR gate in accordance with the pending signal; and a second multiplexer outputting the data waiting signal by selectively outputting signals outputted from the seventeenth AND gate and sixth OR gate in accordance with the pending signal, wherein the fourteenth through twentieth AND gates, the fifth and sixth OR gates, and the first and second multiplexers are parts of the waiting signal generating unit.

7. The circuit of claim 6, wherein the first multiplexer outputs the program waiting signal by outputting the signal from the fifth OR gate when the pending signal is 0, and outputting the signal from the fourteenth AND gate when the pending signal is 1.

8. The circuit of claim 6, wherein the second miltiplexer outputs the data waiting signal by outputting the signal from the sixth OR gate when the pending signal is 0, and outputting the signal from the seventeenth AND gate when the pending signal is 1.

9. The circuit of claim 2, including:

a twenty-first AND gate ANDing an inverted clock signal and the program read signal;

a twenty-second AND gate ANDing the inverted clock signal and data read signal;

a first buffer loading a program signal, which is read in accordance with a signal outputted from the twenty-first AND gate, into a program bus;

a second buffer loading a data signal, which is read in accordance with a signal outputted from the twenty-second AND gate, into the program bus;

a seventh OR gate ORing the program and data read signals, and program and data write signals;

an eighth OR gate ORing the program and data read signals;

a second NOR gate NORing the program and data write signals to output a write enable signal;

a ninth OR gate ORing the program read signal and program write signal;

a twenty-third AND gate ANDing the clock signal and a signal outputted from the seventh OR gate;

a tenth OR gate ORing a signal outputted from the seventh OR gate and a signal outputted from the twenty-third AND gate to output a chip selecting signal;

a twenty-fourth AND gate ANDing the inverted clock signal and a signal outputted from the eighth OR gate to output an output enable signal;

a third multiplexer outputting data memory read/write address signals and program memory read/write address signals in accordance with a signal outputted from the ninth OR gate and the data write signal;

a third buffer outputting a data signal to write in accordance with the data write signal; and a fourth buffer outputting a program signal to write in accordance with the program write signal, wherein the twenty-first through twenty-fourth AND gates, the first through fourth buffers, the seventh through tenth OR gates, and the third multiplexer are parts of the control signal generating unit.

* * * * *